United States Patent [19]

Ishihara et al.

[11] Patent Number: 5,263,888
[45] Date of Patent: Nov. 23, 1993

[54] METHOD OF MANUFACTURE OF LIQUID CRYSTAL DISPLAY PANEL

[75] Inventors: Teruhisa Ishihara, Ishikawa; Shinji Hisamitsu, Hirakata; Hisao Furukawa, Sakai, all of Japan

[73] Assignee: Matsushita Electric Industrial Co., Ltd., Osaka, Japan

[21] Appl. No.: 16,309

[22] Filed: Feb. 11, 1993

[30] Foreign Application Priority Data

Feb. 20, 1992 [JP] Japan .................... 4-033465

[51] Int. Cl.⁵ ............... G02F 1/1339; G02F 1/1341
[52] U.S. Cl. ........................................ 445/25; 445/24
[58] Field of Search ............................. 445/24, 25

[56] References Cited

U.S. PATENT DOCUMENTS 4,407,658 10/1983 Bernot et al. .................... 445/25
4,786,268 11/1988 Zondler et al. ................... 445/25
5,108,332 4/1992 Brosgi ............................. 445/25

Primary Examiner—Kenneth J. Ramsey
Attorney, Agent, or Firm—Pollock, Vande Sande & Priddy

[57] ABSTRACT

A method of manufacture of a liquid crystal display panel is described whereby a fixed number of drops of liquid crystal, or a mixture of liquid crystal and spacers, are dropped at various positions on an electrode face of at least one of a pair of substrates, with the amount of liquid crystal in each of the drops being predetermined to a very high degree of accuracy. One of the substrates is then superposed on the other, under a condition of reduced air pressure, then under a condition of normal atmospheric pressure, mutual lateral position adjustment of the substrates is performed to a high degree of precision.

5 Claims, 4 Drawing Sheets

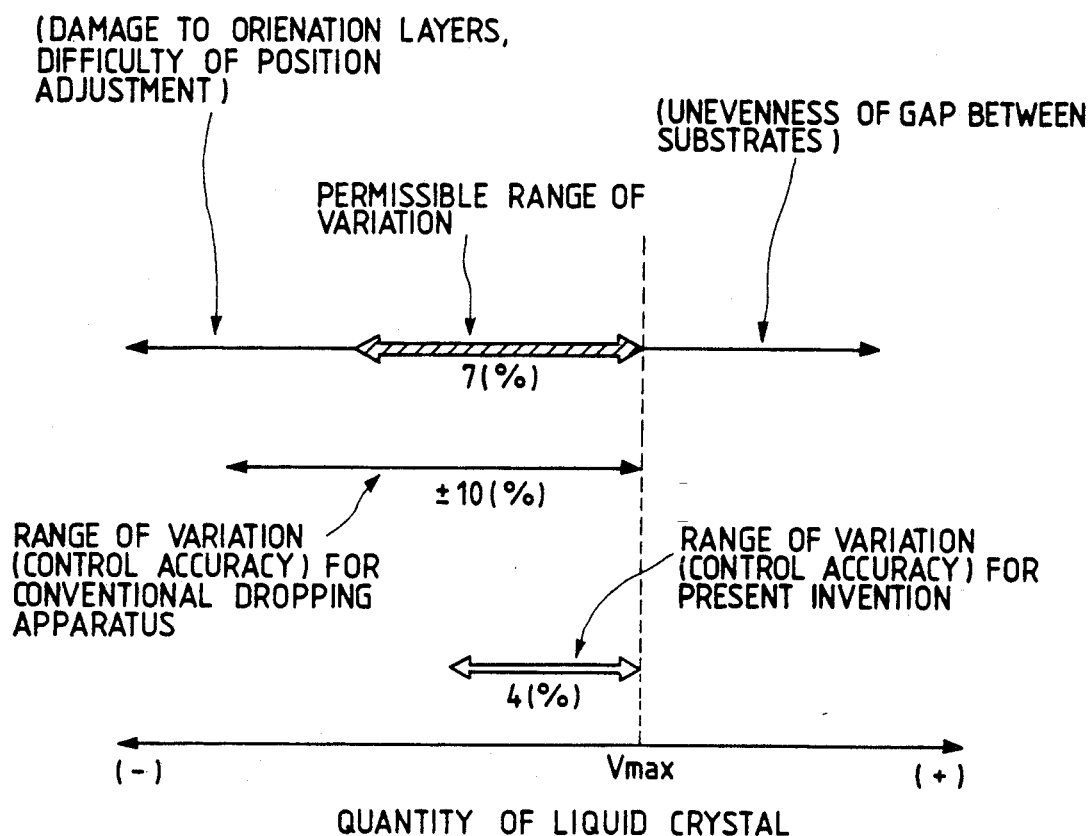

METHOD OF MANUFACTURE OF LIQUID CRYSTAL DISPLAY PANEL

BACKGROUND OF THE INVENTION

1. Field of the Invention

The present invention relates to a method of manufacture of a liquid crystal display panel. In particular, the invention relates to a method of manufacture whereby an operation of precisely mutually aligning the substrates of a liquid crystal display panel is simplified, such that the necessary assembly apparatus can be reduced in scale and complexity.

2. Description of the Related Art

In general, a liquid crystal display panel has the advantages of thinness, light weight, and low power consumption. For that reason, such panels are widely utilized in various types of electronic equipment, from pocket calculators to large-scale office automation equipment. The basic structure of a liquid crystal display panel is as shown in FIG. 1. A thin layer of liquid crystal 2 is retained between two substrates 16a, 16b by a sealing member 19. The substrate 16a has transparent electrodes 17a formed on regions of the inner surface thereof, with an orientation layer 18a (i.e. for molecular alignment of the liquid crystal) formed over the electrodes and the remainder of the inner surface of the substrate. The substrate 16b is similarly formed with transparent electrodes 17b and orientation layer 18b. Spacers 23 are disposed in the liquid crystal, for maintaining a uniform size of gap between the two opposing surfaces of the substrates.

In general, it is necessary to mutually laterally position the two substrates of a liquid crystal display panel to a very high degree of accuracy, i.e. to position one substrate very precisely above the other. The most generally used method of manufacture for such a liquid crystal display panel is as follows. Firstly, an empty cavity is formed, i.e. consisting of the two opposed substrates 16a, 16b accurately mutually aligned, and mutually attached by the sealing member 19 between them, but without the liquid crystal 2. The cavity is then filled with the liquid crystal 2, utilizing a vacuum insertion method. However such a method has various disadvantages, such as a considerable length of time being required to complete the process of filling the cavity with the liquid crystal 2, in the case of a large-size liquid crystal display panel.

For that reason, a method of manufacture has been proposed which is based upon first dropping liquid crystal onto a substrate, as described in Japanese Patent Laid-open No. 62-89025. That method is superior to the vacuum insertion method, since a shorter time is required to fill the space between the two substrates with the liquid crystal. The basic concepts of the "dropping" method are illustrated in FIG. 2, in which a sealing member 22 is formed in a peripheral region of one substrate 20a, while liquid crystal 21 is dropped onto the other substrate 20b. With the two substrates held spaced apart, the substrates are placed within a vacuum chamber of a vacuum assembly apparatus. In that condition (still under atmospheric pressure), the lateral positions of the two substrates 20a, 20b are mutually aligned, i.e. so that the substrate 20a becomes positioned precisely above the substrate 20b. The air pressure within the vacuum chamber is then reduced, and under the condition of low pressure, the two substrates are brought together so that the substrate 20a becomes superposed on the substrate 20b. Thereafter, the sealing member 22 is hardened, e.g. by application of suitable radiation.

However with such a prior art method, it is necessary to execute very accurate mutual lateral alignment of the two substrates while the substrates are within the vacuum chamber, with the substrates being held spaced apart by only a few millimeters. That spacing must then be accurately maintained while a condition of low ambient air pressure is established within the vacuum chamber, and then the two substrates must be accurately brought together such that one substrate is positioned exactly on top of the other. It is therefore necessary to achieve a positioning accuracy which is within the range of several microns to several tens of microns, for position adjustment and position control within the vacuum chamber. Hence, the overall size, complexity and cost of a vacuum assembly apparatus that utilizes such a vacuum chamber become excessive.

Furthermore it is found in practice that even if such a complex and expensive vacuum assembly apparatus is utilized, it is extremely difficult to attain a satisfactory degree of positioning accuracy.

Moreover with such a method, there is an increased possibility of dust or metallic particles being formed within the interior of the vacuum assembly apparatus. This will result in an increase in the most common causes of defects in liquid crystal display panels, i.e. defects due to the presence of dust particles within the panel cavity, short-circuits between the electrodes of the upper and lower substrates, etc.

For that reason, a proposal has been made to facilitate the substrate positioning, in Japanese Patent Laid-open No. 60-241020. With that method, position-determining pins are utilized for alignment purposes at the time of mutual attachment of the two substrates, with these pins having the same position relationships as position-determining pins which had been previously used during a process of forming the patterns of transparent electrodes on the substrates. That method has the advantage of enabling the vacuum assembly apparatus to be simplified to some extent. However the problem remains that it is impossible to achieve mutual positioning of the two substrates to within a sufficient degree of accuracy, i.e. to within several microns.

SUMMARY OF THE INVENTION

It is an objective of the present invention to overcome the problems of the prior art set out above, by providing a method of manufacture of a liquid crystal display panel which can utilize a vacuum assembly apparatus having a simple configuration, and whereby a very high accuracy of mutual positioning of two substrates of a liquid crystal display panel can be achieved.

To achieve the above objectives, according to a first aspect of the present invention, the invention provides a method of method of manufacture of a liquid crystal display panel comprising successive steps of:

forming a sealing member on at least one of respective electrode surfaces of a pair of substrates;

forming at least one drop of a liquid crystal material upon at least one of the electrode surfaces of the pair of substrates;

superposing one of the pair of substrates upon another one of the pair, with the respective electrode surfaces disposed mutually opposing, under a condition of reduced ambient air pressure;

under a condition of normal atmospheric air pressure, executing mutual lateral position adjustment of the pair of substrates; and executing hardening processing of the sealing member.

According to a second aspect of the invention, the plurality liquid crystal material is dropped by means of a liquid crystal dropping apparatus having a plunger and having means for precisely driving the plunger by a fixed degree of movement to thereby eject a fixed amount of the liquid crystal material from a tip portion of the liquid crystal dropping apparatus, the tip portion being in contact with the electrode surface on which the liquid crystal is deposited.

With such a method of manufacture, the only operation which must be performed under a condition of low ambient air pressure, i.e. within the vacuum chamber of a vacuum assembly apparatus, is to superpose one substrate upon the other substrate. At that time, no lateral position adjustment is performed. Hence, the overall configuration of the vacuum assembly apparatus can be extremely simple, and there is only a small possibility of dust or metallic particles being produced within the vacuum assembly apparatus, so that defects in the completed liquid crystal display panel resulting from such particles can be minimized. Precise lateral alignment of the two substrates of the panel is performed after removal from the vacuum chamber, under a condition of ambient atmospheric pressure, so that mutual alignment of the substrates can be performed to a positioning accuracy of within several microns.

Furthermore with the present invention, by precisely controlling the movement of the plunger of a microsyringe which is used to drop the liquid crystal onto a substrate before substrate superposing is performed in the vacuum chamber, an array of precisely measured drops of liquid crystal can be formed. As a result, the total amount of liquid crystal which is disposed between the substrates of the liquid crystal display panel can be very precisely controlled. An optimimum amount of liquid crystal can thereby be provided in the liquid crystal display panel, which will ensure that maximum uniformity is achieved for the gap between the substrates, while also ensuring that the aforementioned mutual lateral positioning of the substrates can be easily performed and moreover will ensure that no damage to the orientation layers of the substrates will occur due to abrasion of the orientation layers by the spacers (which are provided within the liquid crystal, to maintain the size of gap between the opposing substrates) during that lateral positioning operation.

BRIEF DESCRIPTION OF THE DRAWINGS

FIG. 4 is a diagram for graphically illustrating the effects of variations in the amount of liquid crystal which is disposed in a liquid crystal display panel, with the method of the present invention;

DESCRIPTION OF PREFERRED EMBODIMENTS

Figure 1:
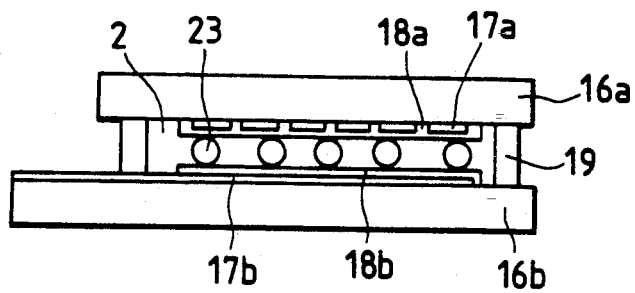
FIG. 1 is a simple cross-sectional view to illustrate the general structure of a liquid crystal display panel.
Figure 2:
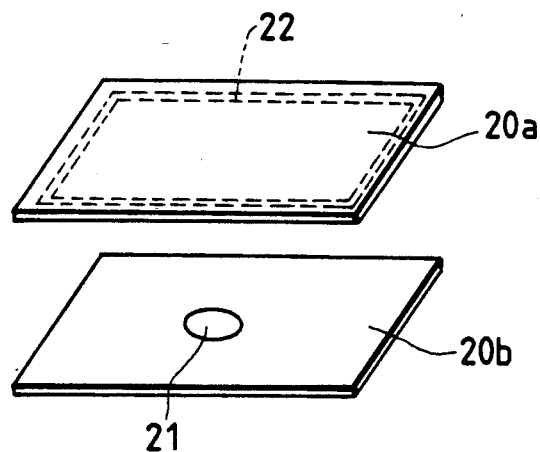
FIG. 2 is a diagram for use in describing a prior art method of manufacture of a liquid crystal display panel.
Figure 3A:
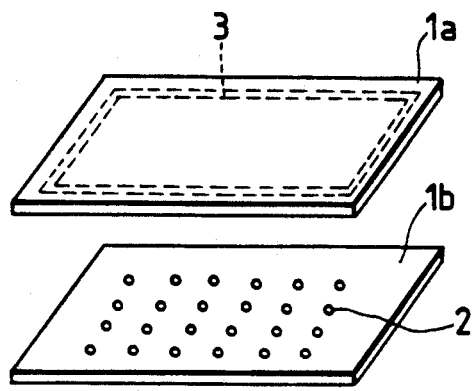
FIGS. 3(a)-3(c) illustrate steps in an embodiment of a method of manufacture of a liquid crystal display panel according to the present invention.
Figure 3B:
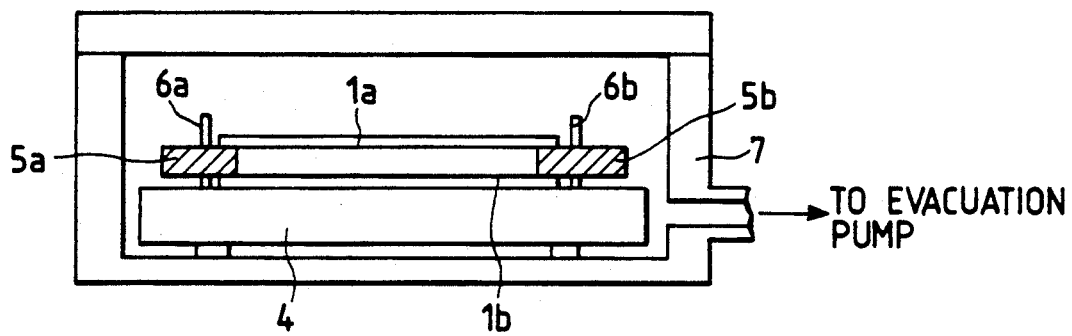
Figure 3C:
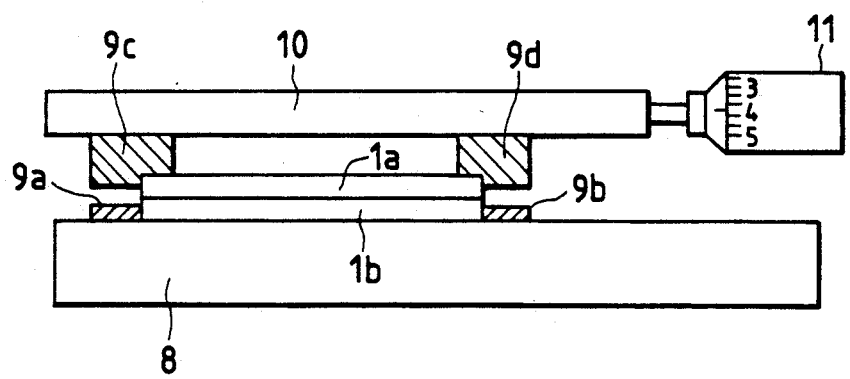

FIGS. 3 (a), (b) and (c) illustrate respective successive steps in a method of manufacture of a liquid crystal display panel according to an embodiment of the present invention. In a first manufacturing step, as illustrated in FIG. 3 (a) numerals 1a and 1b denote respective glass substrates each having transparent electrodes and orienation layers formed thereon as described hereinabove for the prior art example, with the transparent electrodes and orienation layers being omitted from the drawing for simplicity of description. A sealing member 3 is formed by a screen printing process in a peripheral region of a face, having the aforementioned transparent electrodes and orienation layer formed thereon, of the substrate 1a. Such a substrate face, having electrodes formed thereon, will be referred to in the following as an electrode face. In this embodiment the sealing member 3 consists of a resin material which is adapted to be subsequently harded by irradiation with ultra-violet light, but which is initially in an incompletely hardened condition. A plurality of drops of a mixture consisting of nematic liquid crystal and spherical spacers are formed on the electrode face, having the aforementioned transparent electrodes and orienation layer formed thereon, of the substrate 1b. The spacers are combined in the aforementioned mixture in the proportion 0.3 wt %, and are formed of spheres of a solidified resin material. The drops of liquid crystal/resin mixture are deposited on the substrate 1b by means of a microsyringe (as described in detail hereinafter) as a rectangular array pattern of a fixed number of drops arranged at 10 mm intervals, with all of the drops being precisely identical in amount. The mixture of liquid crystal and spacers will be referred to in the following simply as the liquid crystal, unless otherwise stated.

In a second manufacturing step, as illustrated in FIG. 3 (b), the substrates 1a, 1b are arranged as shown within a vacuum chamber 7 of a vacuum assembly apparatus. The substrate 1b is set upon a stage 4, then the substrate 1a is positioned above and spaced apart from the substrate 1b by the interposition of assembly spacer members 5a, 5b, each 5 mm thick, which are removable, and with the electrode faces of the two substrates 1a, 1b mutually opposing. End face pins 6a, 6b are fixedly attached to the stage 4, and the substrates 1a, 1b are initially positioned, in FIG. 3 (b), such that the pins 6a, 6b are spaced 0.5 mm apart from respective adjacent side faces of the substrates. It will be understood that in practice, a greater number of such assembly spacers than two may be provided. Air is then evacuated from the vacuum chamber 7, and when a pressure of 60 Pa has been reached, the assembly spacer members 5a, 5b are removed, so that the substrate 1a becomes superposed on the substrate 1b. At this time, the side face pins 6a, 6b serve to prevent any excessive change in lateral position of the substrates 6a, 6b. The air pressures within the vacuum chamber 7 is then restored to atmospheric pressure. The liquid crystal 2 thereby spreads to continuously fill the space between the two substrates 1a, 1b, extending to the inner periphery of the sealing member 3.

In a third manufacturing step, the pair of substrates 1a, 1b are now set on a stage 8 of a position adjustment apparatus, as illustrated in FIG. 3 (c), with the substrate 1a resting on the stage 8. At that time, the lateral position of the substrate 1b on the stage 8 is fixedly determined by a plurality of position fixing pins, two of which are shown in FIG. 3 (c) and designated as 9a, 9b respectively. It will be understood that in practice a larger number of such pins may be utilized, to precisely fix the lateral position of the substrate 1b. A support member 10 is positioned above the upper substrate 1a, and a plurality of fixing pins which are attached to the support member 10, such as the pins designated as 9c, 9d, fix the position of the substrate 1a against movement with respect to the support member 10. The support member 10 is acted on by a shaft of a micrometer 11, such that the lateral position of the substrate 1a can be adjusted by an operator through actuation of the micrometer 11 while observing (through a microscope) the position of the substrate 1a in relation to a reference mark. The substrate 1a can thereby be adjusted in lateral position until it is set in a predetermined alignment with respect to the substrate 1b, to a very high degree of accuracy. Although for simplicity only a single micrometer is shown in FIG. 3 (c), it will be understood that in practice at least one other micrometer will be utilized, to provide lateral position adjustment of the substrate 1a in a direction at right angles to that shown in FIG. 3 (c), i.e. designating the adjustment direction illustrated in FIG. 3 (c) as the X-direction, position adjustment of the substrate 1a is performed also in the Y-direction of an X-Y plane.

When precise position adjustment has been completed, the sealing member 3 is irradiated with ultra-violet light to be hardened, thereby completing the assembly of the liquid crystal display panel.

Based on a number of experiments which have been performed using the method of manufacture described above, it has been found that the manufacturing process is strongly affected by the amount of liquid crystal that is provided for each panel, in the step of FIG. 3 (a). Specifically:

(a) If the amount is excessively large, then the gap between the two substrates will not be uniform, and (b) If the amount is excessively small, then a negative pressure may exist within between the substrates. As a result, the two substrates are pulled strongly together, tending to reduce the size of the gap between them, and clamping the spacers (mixed with the liquid crystal as described above) between the substrates. Hence it may be found that in the position adjustment operation of FIG. 3 (c), it is extremely difficult, or even impossible, to laterally move the substrate 1a with respect to the substrate 1b. Moreover even if such adjustment movement is possible, the orientation layers of the substrates may be damaged by being scratched by the spacers as a result of the lateral motion of the substrate 1a.

Based on the results of the above experiments, the following has been found. If the diameter of the spacers is held fixed, and the total amount of liquid crystal that is dropped on the substrate 1b is varied, then when that amount exceeds a certain value which will be designated in the following as $V_{max}$, the size of the gap (i.e. spacing between the opposing faces of the substrates 1a, 1b) of the completed liquid crystal display panel will exceed the diameter of the spacers. As a result, the gap will be non-uniform, if the amount of inserted liquid crystal exceeds the value $V_{max}$.

Conversely, if the amount of liquid crystal that is dropped on the substrate 1b is made smaller than $V_{max}$ by 7% or more, then the aforementioned problems which occur when the amount of liquid crystal is excessively small will begin to occur. It is therefore a feature of the method of manufacture of the present invention that the total amount of liquid crystal (or, as in this embodiment, the total amount of liquid crystal/spacer mixture) which is dropped onto the substrate 1b in the step of FIG. 3 (a) must be accurately controlled to be no greater than the value $V_{max}$ and to be no smaller than $V_{max}$ by 7%. It has been found that if these conditions are satisfied, then the various problems described above with regard to difficulty of position adjustment, damage to the orientation layers, and non-uniformity of the gap, can be eliminated.

These conditions are illustrated graphically in FIG. 4.

In addition, from the results of experiments performed using the method of manufacture described above it has been found that damage to the orientation layers may result during the lateral positioning operation of the substrates which is described above referring to FIG. 3 (c), if the spacers are not mutually separate within the liquid crystal but are formed into aggregations, or if the spacers have rough surfaces. For that reason, it is necessary with the method of manufacture of the present invention to utilize spacers which have smooth surfaces, and which do not form aggregations within the liquid crystal.

As described above, in order to successfully apply the method of manufacture of a liquid crystal display panel of the present invention, it is necessary to achieve a very high accuracy of determining the total quantity of liquid crystal that is disposed between the substrates of the liquid crystal panel. Specifically, as described hereinabove referring to FIG. 4, it is essential to control that quantity to within a range of variation of 7% (i.e. ±3.5%). It has been found that the greater is made the accuracy of forming drops of liquid crystal on the substrate 1b in the manufacturing step of FIG. 3 (a) described above, the better will be the overall results which are obtained, in terms of the manufacturing yield of high-quality display panels.

The basic requirements for a liquid crystal dropping apparatus for depositing drops of liquid crystal on a substrate, in the manufacturing step of FIG. 3 (a), are as follows:

(1) The dropping apparatus must provide the requisite high degree of accuracy of depositing amounts of liquid crystal, and (2) It is essential that an ejection nozzle tip of the liquid crystal dropping apparatus shall not damage the orientation layer of the substrate onto which the drops of liquid crystal are deposited.

It has been found as a result of various experiments using prior art types of liquid crystal dropping apparatus that, even if the requirement (2) above is satisfied, it is not possible to attain sufficient accuracy to satisfy requirement (1) above. It has been found from these experiments, using various types of prior art liquid crystal ejection apparatus such as dispensers or tube-type liquid transport pumps, etc., that the ejection accuracy (R/Xav) is ±10% or worse, where R denotes the amount of deviation and Xav denotes the average value. Hence it has not been found possible using such a prior art type of liquid crystal ejection apparatus to achieve sufficient accuracy for use with the method of manufacture of a liquid crystal display panel according to the present invention.

Figure 5A:
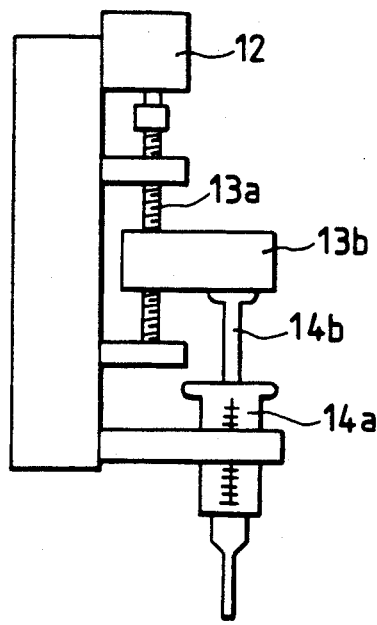
FIGS. 5(a)-5(b) illustrate various aspects of a microsyringe which is used in the method of FIG. 3, for dropping precisely determined amounts of liquid crystal.
Figure 5B:
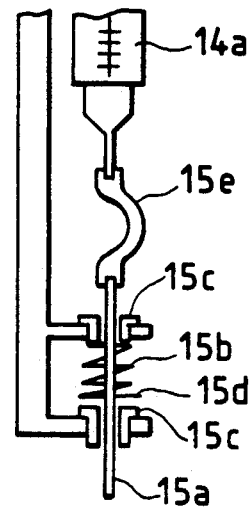

A liquid crystal dropping apparatus will be described in the following, referring to the FIGS. 5, which has been found suitable for achieving such a requisite high degree of accuracy of depositing drops of liquid crystal upon a liquid crystal display panel substrate. The liquid crystal dropping apparatus is based on a microsyringe. The upper and lower parts of the apparatus are as shown in FIGS. 5 (a) and (b) respectively. In FIG. 5 (a), a pulse motor 12 rotates a screw shaft 13a which passes through a corresponding threaded aperture in a nut 13b. The nut 13b bears against an upper surface of a plunger 14b of a microsyringe 14a, with the barrel of the microsyringe 14a containing liquid crystal (or a mixture of liquid crystal and spacers). Movement of the plunger 14b can thereby be controlled to a very high degree of accuracy, by rotation of the shaft 13a of the pulse motor 12. Amounts of liquid crystal which are ejected from the microsyringe 14a can thereby determined to a high degree of accuracy. Specifically, the amount of vertical motion of the plunger 14b, and hence the amount of liquid crystal which is ejected by the microsyringe 14a, can be very precisely determined by supplying a specific number of electrical pulses to drive the pulse motor 12. It has been found that when depositing drops of nematic liquid crystal using the apparatus of FIG. 5 (a), the measured degree of ejection accuracy is within ±2%, in the case of forming a droplet of 200 milligrams. In the case of a high-viscosity material, e.g. smectic liquid crystal, it has been found that the ejection accuracy is within ±5%.

Figure 6A:
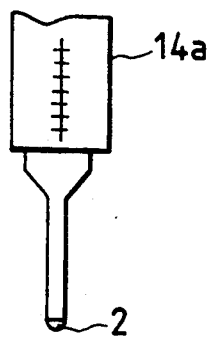
FIGS. 6(a)-6(c) are each a diagram illustrating conditions at a nozzle tip of a microsyringe from which liquid crystal is ejected.
Figure 6B:
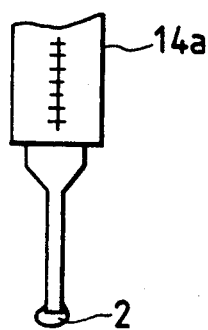
Figure 6C:
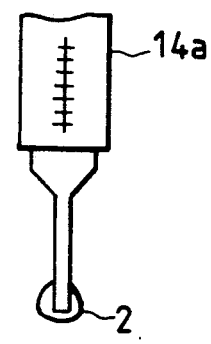

FIGS. 6 (a), (b) and (c) illustrate conditions at the tip of a microsyringe such as the microsyringe 14a of FIG. 5, when ejecting liquid crystal. As illustrated, due to surface tension of the liquid crystal, the liquid crystal tends to accumulate around the nozzle tip of the microsyringe. If such a microsyringe is used to deposit the drops of liquid crystal on the substrate, i.e. with the microsyringe being successively moved across the substrate surface in order to deposit an array of separate drops as illustrated in FIG. 3 (a), then in order to ensure that the nozzle tip of the microsyringe will not damage the orientation layer on the substrate, it is necessary to maintain a spacing of several microns between the tip of the nozzle and the substrate surface. However in practice, as can be understood from the conditions at the nozzle tip illustrated in FIG. 6, with an accumulation of liquid crystal being formed around the tip of the nozzle, it is extremely different to execute control to maintain such a spacing between the nozzle tip and the substrate. However it has been found that even if the nozzle tip should contact the substrate surface, so long as the contact pressure exerted between the nozzle tip and the substrate is sufficiently small and so long as sliding movement of the nozzle tip across the substrate does not occur, then no problems will arise with regard to damage to the orientation layer which is formed on the substrate surface.

For that reason, the ejection tip apparatus which is illustrated in partial cross-sectional view in FIG. 5 (b) is utilized in conjunction with the microsyringe of FIG. 5 (a) for forming the drops of liquid crystal on the substrate 1b of FIG. 3, in order to successfully implement the method of manufacture of a liquid crystal display panel according to the present invention described hereinabove. As indicated this ejection tip apparatus is attached to the nozzle tip of the microsyringe 14a, and includes a flexible tube 15e which is fitted over the nozzle tip of the microsyringe as shown, a small-diameter tube 15a (referred to in the following as the dropping needle) having an internal diameter of 0.3 mm into which liquid crystal is transferred via the tube 15e from the microsyringe 14a, a packing member 15c formed of Teflon and having an inner diameter of 0.7 mm, a coil spring 15b which is formed from piano wire having a wire diameter of 0.3 mm, and which has a spring constant of 35 gf/mm, and a retaining member 15d for attaching the dropping needle 15a to the spring 15b. Such an ejection tip apparatus ensures that even if the dropping needle 15a should contact the substrate during formation of the drops of liquid crystal on the substrate surface, the dropping needle 15a can freely move in the upward direction against the resistance of the coil spring 15b, such that the contact pressure exerted at the dropping needle is sufficiently low to permit sliding motion between the dropping needle and the substrate surface without danger of damage to the orientation layer of the substrate.

It has been found that by using the liquid crystal dropping apparatus of FIG. 5, by comparison with use of prior art types of liquid crystal ejection apparatus, extremely small drops of liquid crystal can be formed on a substrate surface, with a very high degree of accuracy of control of the amount of liquid crystal in each drop. Thus, a large number of very small drops can be deposited on the substrate surface, with the total amount of liquid crystal in these drops being accurately determined.

As a result, in the case of a mixture of liquid crystal and spacers being deposited by such a liquid crystal dropping apparatus, it is found that the spacers are distributed more uniformly over the substrate surface than has been possible with prior art types of liquid crystal ejection apparatus. Hence, a greater degree of accurate uniformity of the gap between the two substrates in the completed liquid crystal display panel can be achieved, by comparison with the prior art.

It should be noted that although it has been assumed that with the embodiment of the present invention described hereinabove a mixture of nematic liquid crystal and spacers is dropped onto the substrate 1b, the invention is not limited to this. It would be equally possible to use a smectic liquid crystal material, or to drop only the liquid crystal onto the substrate 1b and to dispose the spacers beforehand on the surface of the substrate 1b.

If a liquid crystal material having a high value of viscosity such as smectic liquid crystal is used, then it may be found that an insufficient degree of spreading of the liquid crystal will occur during the manufacturing step of FIG. 3 (b) described above, after the upper substrate 1a has been superposed on the lower substrate 1b in a condition of reduced ambient air pressure, then normal ambient atmospheric pressure restored. In such a case, it may be necessary to subject the finally completed liquid crystal display panel to heat treatment after the sealing member 3 has been hardened, in order to ensure that the liquid crystal will completely fill the cavity formed between the two substrates, extending completely to the inner periphery of the sealing member 3.

Moreover although with the embodiment of the present invention described above, the sealing member 3 and the drops of liquid crystal 2 are formed on respectively different ones of the substrates 1a, 1b before the substrates are brought together, it would be equally possible to form the sealing member 3 on the same substrate as that on which the liquid crystal drops are formed. Alternatively, it would be possible to form the drops of liquid crystal on both of the substrates prior to bringing the substrates together.

Furthermore although in the liquid crystal dropping apparatus of FIG. 5 a screw-and-nut drive mechanism is used in combination with a pulse motor for actuating the liquid crystal ejection microsyringe with a high degree of accuracy, it would be also possible to utilize other forms of drive mechanism, such as a combination of a linear motor and a decoder for example.

Moreover it should be noted that the present invention is not limited to the various specific values which have been given for the embodiment described above, such as the spring constant of the ejection tip apparatus. For example, the spring constant can be selected to be appropriate for the degree of hardness of the orientation layer. Furthermore it might be found advantageous to form the dropping needle 15a from a relatively soft material such as a resin material.

It can be understood from the above description that with a method of manufacture of a liquid crystal display panel according to the present invention, whereby precisely measured drops of liquid crystal are accurately deposited on a substrate in an initial step of the manufacturing process, it becomes possible to produce liquid crystal display panels which are of high quality and have excellent uniformity of the gap between the opposing substrates, by comparison with prior art methods of manufacturing.

Moreover the method of manufacture of a liquid crystal display panel according to the present invention successfully overcomes the problems of prior art methods of method of manufacture, with regard to mutually accurately positioning the two substrates of the liquid crystal display panel. In addition, since the operations which are performed under conditions of reduced air pressure within a vacuum chamber are extremely simple, the configuration of a vacuum assembly apparatus containing that vacuum chamber can be accordingly simple, so that the size and complexity of the assembly apparatus as a whole can be reduced by comparison with the prior art.

What is claimed is:

1. A method of manufacture of a liquid crystal display panel comprising successive steps of:
   forming a sealing member on at least one of respective electrode surfaces of a pair of substrates;
   forming at least one drop of a liquid crystal material upon at least one of said electrode surfaces of the pair of substrates;
   superposing one of said pair of substrates upon another one of said pair with said respective electrode surfaces disposed mutually opposing, under a condition of reduced ambient air pressure;
   under a condition of normal atmospheric air pressure, executing mutual lateral position adjustment of said pair of substrates; and
   executing hardening processing of said sealing member.

2. A method of manufacture of a liquid crystal display panel comprising successive steps of:
   forming a sealing member on at least one of respective electrode surfaces of a pair of substrates;
   forming at least one drop of a liquid crystal material upon at least one of said electrode surfaces of the pair of substrates, by means of a liquid crystal dropping apparatus having a plunger and means for precisely driving said plunger by a fixed degree of movement to thereby eject a fixed amount of said liquid crystal material from a tip portion of said liquid crystal dropping apparatus, said tip portion being in contact with said at least one of the electrode surfaces;
   superposing one of said pair of substrates upon another one of said pair with said respective electrode surfaces disposed mutually opposing, under a condition of reduced ambient air pressure;
   under a condition of normal atmospheric air pressure, executing mutual lateral position adjustment of said pair of substrates; and
   executing hardening processing of said sealing member.

3. A method of manufacture of a liquid crystal display panel according to claim 1 or 2, wherein said liquid crystal material consists of a mixture of liquid crystal and spacers.

4. A method of manufacture of a liquid crystal display panel according to claim 1 or 2, wherein a plurality of drops of said liquid crystal material are formed on said at least one of the electrode surfaces as an array of drops which are mutually separated by fixed spacings.

5. A method of manufacture of a liquid crystal display panel according to claim 2, wherein said tip portion of the liquid crystal dropping apparatus is restrained by a spring such as to apply a predetermined amount of surface pressure to said at least one of the electrode surfaces.

* * * * *